(12) United States Patent
Zhang et al.

(10) Patent No.: US 11,326,334 B2
(45) Date of Patent: May 10, 2022

(54) RETURN GAS PREVENTION DEVICE FOR DRAINAGE PIPE

(71) Applicant: ZHEJIANG OCEAN UNIVERSITY, Zhoushan (CN)

(72) Inventors: Yulian Zhang, Zhoushan (CN); Chen Zhang, Zhoushan (CN); Hai Zhang, Zhoushan (CN); Qin Wang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 176 days.

(21) Appl. No.: 16/930,496

(22) Filed: Jul. 16, 2020

(65) Prior Publication Data

US 2021/0017754 A1 Jan. 21, 2021

(30) Foreign Application Priority Data

Jul. 16, 2019 (CN) .......................... 201910642261.6

(51) Int. Cl.
*G05D 7/01* (2006.01)
*E03F 3/04* (2006.01)
(Continued)

(52) U.S. Cl.
CPC .............. *E03F 3/04* (2013.01); *G05D 7/016* (2013.01); *F16K 24/044* (2013.01); *F16K 31/24* (2013.01); *G05D 9/02* (2013.01); *Y10T 137/7365* (2015.04)

(58) Field of Classification Search
CPC ..... E03F 3/04; E03F 5/10; E03F 5/042; E03F 3/02; G05D 7/016; G05D 9/02; G05D 9/12; B60K 15/035; B60K 15/03504; B60K 15/03519; B60K 15/03289; B60K 2015/03289; F16L 47/02; F16L 47/14; F02M 37/017; F02M 37/0076; F16K 24/04; F16K 24/06; F16K 27/07; F16K 31/18; F16K 31/22; F16K 31/24; F16K 24/042; F16K 24/044; F16K 33/00; F16K 37/0058; F16K 37/0075; F16K 21/185; F16K 31/30; F16K 47/023; Y10T 137/0874; Y10T 137/3099; Y10T 137/7365; Y10T 137/7436; Y10T 137/7423; Y10T 137/7358; Y10T 137/7368;
(Continued)

(56) References Cited

U.S. PATENT DOCUMENTS 1,407,136 A * 2/1922 Ehrhart .................... F01B 25/00
137/433
1,906,277 A * 5/1933 McGee .................... F16K 31/22
137/433
(Continued)

FOREIGN PATENT DOCUMENTS

CN 2429582 Y 5/2001
CN 205676967 X 11/2016
(Continued)

*Primary Examiner* — Craig J Price
(74) *Attorney, Agent, or Firm* — True Shepherd LLC; Andrew C. Cheng

(57) ABSTRACT

The present disclosure provides a return gas prevention device for a drainage pipe, belonging to the technical field of drainage pipes. The device realizes two functions of water seal and a check valve simultaneously, as well as prevents gas channeling in a drainage process.

8 Claims, 4 Drawing Sheets

(51) Int. Cl.
*F16K 24/04* (2006.01)
*F16K 31/24* (2006.01)
*G05D 9/02* (2006.01)

(58) Field of Classification Search
CPC ..... Y10T 137/8359; A01G 25/02; E03B 3/02;
E03C 1/1225; E03C 1/29; E03C 1/28
USPC ..... 137/15.26, 38, 39, 43, 315.08, 409, 429,
137/430, 587, 588, 433, 411, 412, 165,
137/193, 247.17, 247.21, 398, 572;
220/86.2, 745, 746; 141/59, 198, 202,
141/229; 123/516, 518, 198 D, 520
See application file for complete search history.

(56) References Cited

U.S. PATENT DOCUMENTS

| | | | | |
|---|---|---|---|---|
| 2,540,361 A * | 2/1951 | Whitley | ............... | G05D 9/02 137/426 |
| 3,025,880 A * | 3/1962 | Anderson | ............... | G05D 9/02 137/625.33 |
| 4,166,791 A * | 9/1979 | Marvin | ............... | F16K 24/044 210/120 |
| 5,088,133 A * | 2/1992 | Chen | ............... | E03D 1/302 137/433 |
| 8,689,821 B2 * | 4/2014 | Miller | ............... | F16K 47/023 137/430 |
| 8,701,695 B2 * | 4/2014 | Beetham | ............... | F16K 24/044 137/202 |
| 10,287,153 B1 * | 5/2019 | Langiano | ............... | B67D 3/0038 |

FOREIGN PATENT DOCUMENTS

| | | |
|---|---|---|
| CN | 107338851 A | 11/2017 |
| JP | H07229191 A | 8/1995 |
| JP | H09126333 A | 5/1997 |

* cited by examiner

RETURN GAS PREVENTION DEVICE FOR DRAINAGE PIPE

CROSS-REFERENCE TO RELATED APPLICATIONS

This application claims priority to Chinese Patent Application No. 201910642261.6 with a filing date of Jul. 16, 2019. The content of the aforementioned application, including any intervening amendments thereto, are incorporated herein by reference.

TECHNICAL FIELD

The present disclosure belongs to the technical field of drainage pipes, and relates to a return gas prevention device for a drainage pipe.

BACKGROUND

Drainage pipes are pipe networks for discharging and transporting sewage.

When a drainage pipe discharges sewage, it is required to prevent gas channeling along the drainage pipe. For such problems, a water seal or a check valve is used generally to prevent gas return at present. Normally, the water seal and the check valve cannot be used simultaneously. Although the above two manners are effective in preventing gas return in a case of no discharge of sewage, some gases will inevitably return due to a pressure during sewage discharge, reducing a sewage discharge speed.

In addition, when the drainage pipe is applied to a biogas digester, toxic and harmful combustible gases may be generated in the biogas digester. If these gases return, there will be a risk of explosion when the combustible gases indoors reach a certain concentration.

SUMMARY

To solve the above problems in the prior art, the present disclosure provides a return gas prevention device for a drainage pipe, which can realize two functions of water seal and a check valve simultaneously as well as prevent gas channeling in a drainage process.

The object of the present disclosure may be achieved through the following technical solution.

A return gas prevention device for a drainage pipe includes a round pipe, a water inlet, a water outlet and a drainage mechanism. The round pipe includes an upper sealing plate, a lower sealing plate, a first partition plate and a second partition plate, where the upper sealing plate and the lower sealing plate are located at upper and lower ends of the round pipe respectively, a third through-hole is disposed on the lower sealing plate, the first partition plate and the second partition plate are both located inside the round pipe and partition the interior of the round pipe into an upper cavity, a middle cavity and a lower cavity in a top-down sequence, a first through-hole is disposed on the first partition plate, and a second through-hole is disposed on the second partition plate.

The water inlet is in communication with the bottom of the upper cavity, and the water outlet is disposed on the lower sealing plate and in communication with the third through-hole.

The drainage mechanism includes a floating ball, a guiding structure and a blocking structure. The floating ball is located inside the upper cavity. The guiding structure enables the floating ball to move up and down in the upper cavity along with rise and fall of a water level. When the floating ball ascends with the rising water level in the upper cavity, the blocking structure can block the second through-hole and open the first through-hole and the third through-hole simultaneously; when the floating ball descends along with the falling water level in the upper cavity, the blocking structure can block the first through-hole and the third through-hole and open the second through-hole simultaneously.

The above return gas prevention device for a drainage pipe further includes a gas discharge mechanism and a driving mechanism.

The gas discharge mechanism includes an inlet gas pipe with one end in communication with the top of the upper cavity and the other end in communication with the outside; a first communication gas pipe with one end in communication with the top of the upper cavity and the other end in communication with the top of the middle cavity; a second communication gas pipe with one end in communication with the top of the middle cavity and the other end in communication with the top of the lower cavity; and a third communication gas pipe with one end in communication with the top of the lower cavity and the other end in communication with the water outlet.

When the floating ball ascends along with the rising water level in the upper cavity, the driving mechanism can close the inlet gas pipe and the third communication gas pipe and open the first communication gas pipe and the second communication gas pipe simultaneously; when the floating ball descends along with the falling water level in the upper cavity, the driving mechanism can close the first communication gas pipe and the second communication gas pipe and open the inlet gas pipe and the third communication gas pipe simultaneously.

In the above return gas prevention device for a drainage pipe, the guiding structure includes two guiding rods and two guiding blocks.

The two guiding rods are both vertically disposed inside the upper cavity and located at both sides of the floating ball respectively.

The two guiding blocks are both disposed on the floating ball, and the two guiding blocks are in one-to-one correspondence with the two guiding rods, and slidably disposed on the corresponding guiding rods.

In the above return gas prevention device for a drainage pipe, the blocking structure includes a connecting rod.

One end of the connecting rod is fixedly connected at the bottom of the floating ball, and the other end of the connecting rod passes through the first through-hole, the second through-hole and the third through-hole sequentially. The connecting rod includes a first sealing block that is located above the first through-hole and has a size larger than a diameter of the first through-hole; a second sealing block that is located below the second through-hole and has a size larger than a diameter of the second through-hole; and a third sealing block that is located above the third through-hole and has a size larger than a diameter of the third through-hole.

In the above return gas prevention device for a drainage pipe, the driving mechanism includes four on-off valves, a first driving structure and a second driving structure.

The four on-off valves are disposed on the inlet gas pipe, the first communication gas pipe, the second communication gas pipe and the third communication gas pipe respectively.

When the floating ball ascends with the rising water level in the upper cavity, the first driving structure can close the on-off valve on the inlet gas pipe and open the on-off valve on the second communication gas pipe simultaneously; when the floating ball descends with the falling water level in the upper cavity, the first driving structure can open the on-off valve on the inlet gas pipe and close the on-off valve on the second communication gas pipe simultaneously.

When the floating ball ascends with the rising water level in the upper cavity, the second driving structure can open the on-off valve on the first communication gas pipe and close the on-off valve on the third communication gas pipe simultaneously; when the floating ball descends with the falling water level in the upper cavity, the second driving structure can close the on-off valve on the first communication gas pipe and open the on-off valve on the third communication gas pipe simultaneously.

In the above return gas prevention device for a drainage pipe, the first driving structure includes a first sliding rod, a first sliding block and a first connecting rod.

The first sliding rod is fixedly disposed on an outer side wall of the round pipe through two support plates, and a length direction of the first sliding rod is consistent with a length direction of the round pipe.

The first sliding block is slidably disposed on the first sliding rod, and the first sliding block and the guiding block located at the left side of the floating ball are both permanent magnets. When sliding up and down, the guiding block at the left side of the floating ball can drive the first sliding block to slide up and down.

The first connecting rod is fixedly disposed on the first sliding block, one end of the first connecting rod is connected with the on-off valve on the inlet gas pipe, and the other end of the first connecting rod is connected with the on-off valve on the second communication gas pipe; when the first connecting rod moves upward, the on-off valve on the inlet gas pipe is closed, and the on-off valve on the second communication gas pipe is opened simultaneously; when the first connecting rod moves downward, the on-off valve on the inlet gas pipe is opened, and the on-off valve on the second communication gas pipe is closed simultaneously.

In the above return gas prevention device for a drainage pipe, the second driving structure includes a second sliding rod, a second sliding block and a second connecting rod.

The second sliding rod is fixedly disposed on the outer side wall of the round pipe through two support plates, and a length direction of the second sliding rod is consistent with the length direction of the round pipe.

The second sliding block is slidably disposed on the second sliding rod, the second sliding block and the guiding block located at the right side of the floating ball are both permanent magnets. When sliding up and down, the guiding block at the right side of the floating ball can drive the second sliding block to slide up and down.

One end of the second connecting rod is connected with the on-off valve on the first communication gas pipe, and the other end of the second connecting rod is connected with the on-off valve on the third communication gas pipe; when the second connecting rod moves upward, the on-off valve on the first communication gas pipe is opened, and the on-off valve on the third communication gas pipe is closed simultaneously; when the second connecting rod moves downward, the on-off valve on the first communication gas pipe is closed, and the on-off valve on the third communication gas pipe is opened simultaneously.

In the above return gas prevention device for a drainage pipe, two penetration holes are disposed in a left-right symmetry on the outer side wall of the round pipe, a glass cover is sealably disposed on each of the penetration holes, and the two glass covers are located at left and right sides of the floating ball respectively, and the two glass covers are in one-to-one correspondence with two guiding blocks, and located at outer sides of the corresponding guiding blocks.

Compared with the prior art, the present disclosure has the following advantages.

1. In an initial state, the first sealing block and the third sealing block simultaneously block the first through-hole and the third-through hole due to the gravity of the floating ball and the connecting rod, and at this time, the second sealing block is located below the third through-hole. When sewage flows into the upper cavity from the water inlet, the water level in the upper cavity rises continuously. When the water level reaches the position of the floating ball and continues rising to bring the floating ball to float upward, the connecting rod, the first sealing block and the third sealing block move upward, the first through-hole and the third through-hole are opened, and at the same time, the second sealing block moves upward to block the second through-hole. The sewage in the upper cavity flows into the middle cavity through the first through-hole, and the water level in the middle cavity rises continuously. When a water pressure in the middle cavity is greater than the buoyancy of the floating ball, the second sealing block moves downward to open the second through-hole, and at the same time, the first sealing block and the third sealing block move downward to block the first through-hole and the third through-hole. The sewage in the middle cavity flows into the lower cavity through the second through hole. When the sewage in the middle cavity is reduced to be less than the buoyancy of the floating ball, the floating ball drives the connecting rod and the second sealing block to move upward to block the second through-hole, and at the same time, the first sealing block and the third sealing block move upward to open the first through-hole and the third through-hole. The sewage in the upper cavity flows into the middle cavity through the first through-hole, and the sewage in the lower cavity flows into the water outlet through the third through-hole. When the connecting rod moves up and down, the sewage in the water inlet flows into the middle cavity from the upper cavity, then flows into the lower cavity from the middle cavity, and finally flows out of the water outlet. Thus, the drainage function is simple and reliable. In addition, when no sewage enters the water inlet, the high water pressure in the water outlet pushes the third sealing block upward to enable the sewage in the water outlet to enter the lower cavity. However, since the connecting rod moves upward to enable the second sealing block to block the second through-hole, the sewage cannot re-enter the middle cavity, thereby effectively preventing backflow of the sewage.

2. When the sewage flows into the upper cavity from the water inlet, the water level in the upper cavity rises continuously, the floating ball floats upward with the water level, and the driving mechanism closes the inlet gas pipe and the third communication gas pipe and opens the first communication gas pipe and the second communication gas pipe simultaneously. Thus, the gas in the upper cavity is discharged into the middle cavity through the first communication gas pipe. Since the floating ball floats upward, the first sealing block and the third sealing block move upward to open the first through-hole and the third-though hole, and at the same time, the second sealing block moves upward to block the second through-hole. Thus, the sewage in the upper cavity flows into the middle cavity through the first through-hole, the water level in the middle cavity rises, the pressure in the middle cavity is greater than the pressure in the lower cavity, and therefore the gas in the middle cavity flows into the lower cavity through the second communication gas pipe. When the sewage in the upper cavity flows into the middle cavity continuously to enable a weight of the sewage in the middle cavity to be greater than the buoyancy of the floating ball in the upper cavity, the floating ball floats downward, and the driving mechanism opens the inlet gas pipe and the third communication gas pipe and closes the first communication gas pipe and the second communication gas pipe simultaneously. Thus, the water level in the upper cavity descends to form a negative pressure so as to enable air to enter the upper cavity through the inlet gas pipe. Since the flowing ball descends, the first sealing block and the third sealing block move downward to block the first through-hole and the third through-hole, and the second sealing block moves downward to open the second through hole. The sewage in the middle cavity flows into the lower cavity through the second through-hole, and the pressure in the lower cavity is greater than the pressure in the water outlet, so that the gas in the lower cavity is discharged into the water outlet through the third communication gas pipe. Since the first through-hole is blocked, the water level in the upper cavity starts to rise, the floating ball floats upward, and the driving mechanism re-closes the inlet gas pipe and the third communication gas pipe and re-opens the first communication gas pipe and the second communication gas pipe. In this case, the pressure in the upper cavity is greater than the pressure in the middle cavity, and the gas in the upper cavity flows into the middle cavity through the first communication gas pipe. In the drainage process, external air enters the water outlet continuously through the inlet gas pipe, the first communication gas pipe, the second communication gas pipe and the third communication gas pipe to prevent channeling and returning of the gas in the water outlet, and thus the device is easy and practical.

3. The rise and fall of the water level in the upper cavity drive the floating ball to float up and down, and magnetic forces of the guiding blocks drive the first sliding block and the second sliding block to slide up and down, so as to rapidly control opening and closing of the inlet gas pipe, the first communication gas pipe, the second communication gas pipe and the third communication gas pipe, and thus the device is simple in structure.

Numerals of the drawings are described as follows: 1. round pipe, 11. first partition plate, 111. first through-hole, 12. second partition plate, 121. second through-hole, 13. upper sealing plate, 14. lower sealing plate, 141. third through-hole, 15. upper cavity, 151. inlet gas pipe, 152. first communication gas pipe, 153. guiding rod, 154. penetration hole, 155. glass cover, 16. middle cavity, 161. second communication gas pipe, 17. lower cavity, 171. third communication gas pipe, 2. floating ball, 21. connecting rod, 211. first sealing block, 212. second sealing block, 213. third sealing block, 22. guiding block, 3. first sliding block, 31. first sliding rod, 4. on-off valve, 41. valve cavity, 42. air hole, 43. blocking plate, 5. second sliding block, 51. second sliding rod, 6. first connecting rod, 7. second connecting rod, 8. water inlet, 81. inlet water pipe, 9. water outlet, and 91. outlet water pipe.

DETAILED DESCRIPTION OF THE EMBODIMENTS

The technical solution of the present disclosure will be further described below in combination with specific examples and accompanying drawings, but the present disclosure is not limited to these examples.

Figure 1:
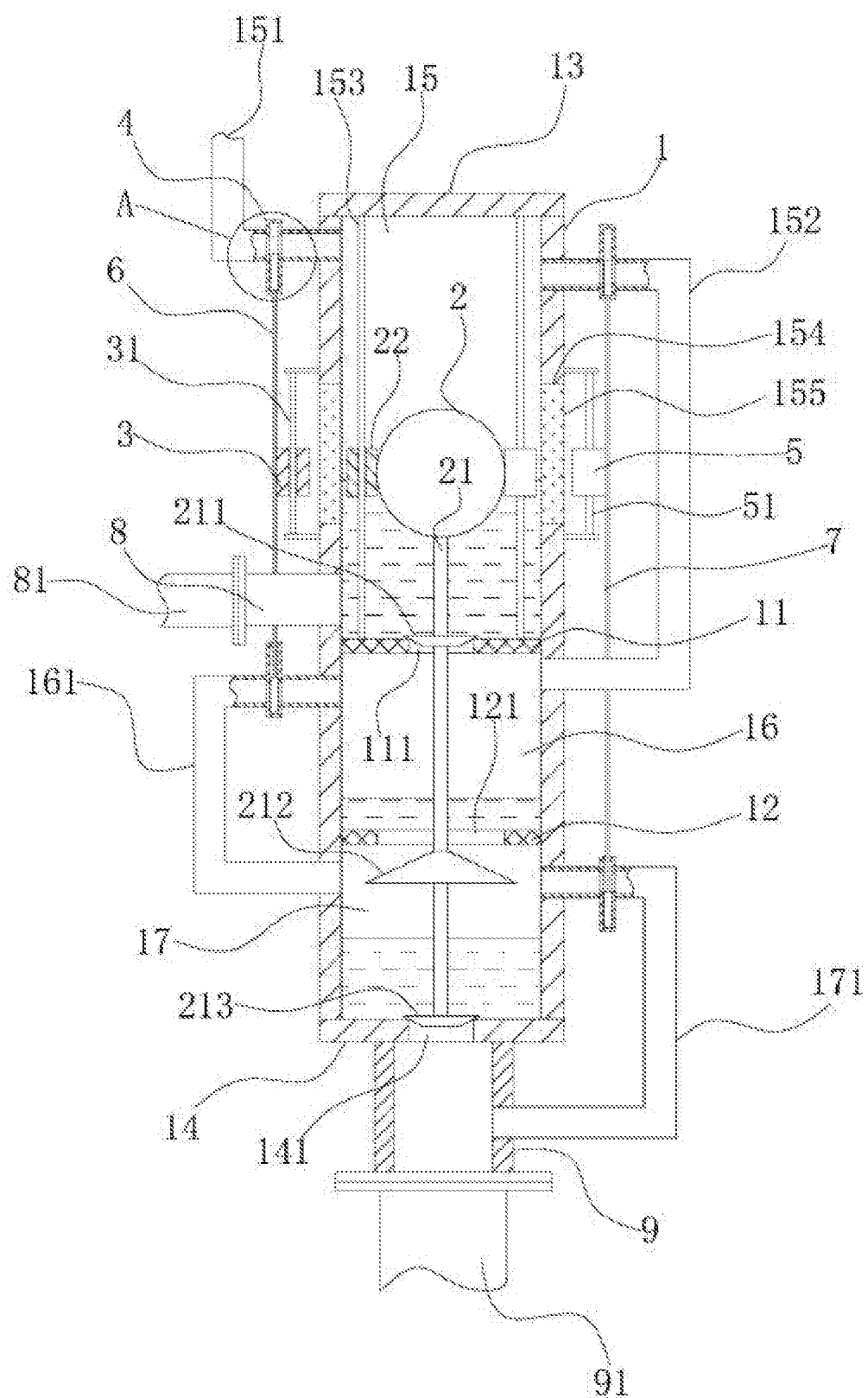
FIG. 1 is a structural schematic diagram illustrating a return gas prevention device for a drainage pipe according to an example of the present disclosure.
Figure 2:
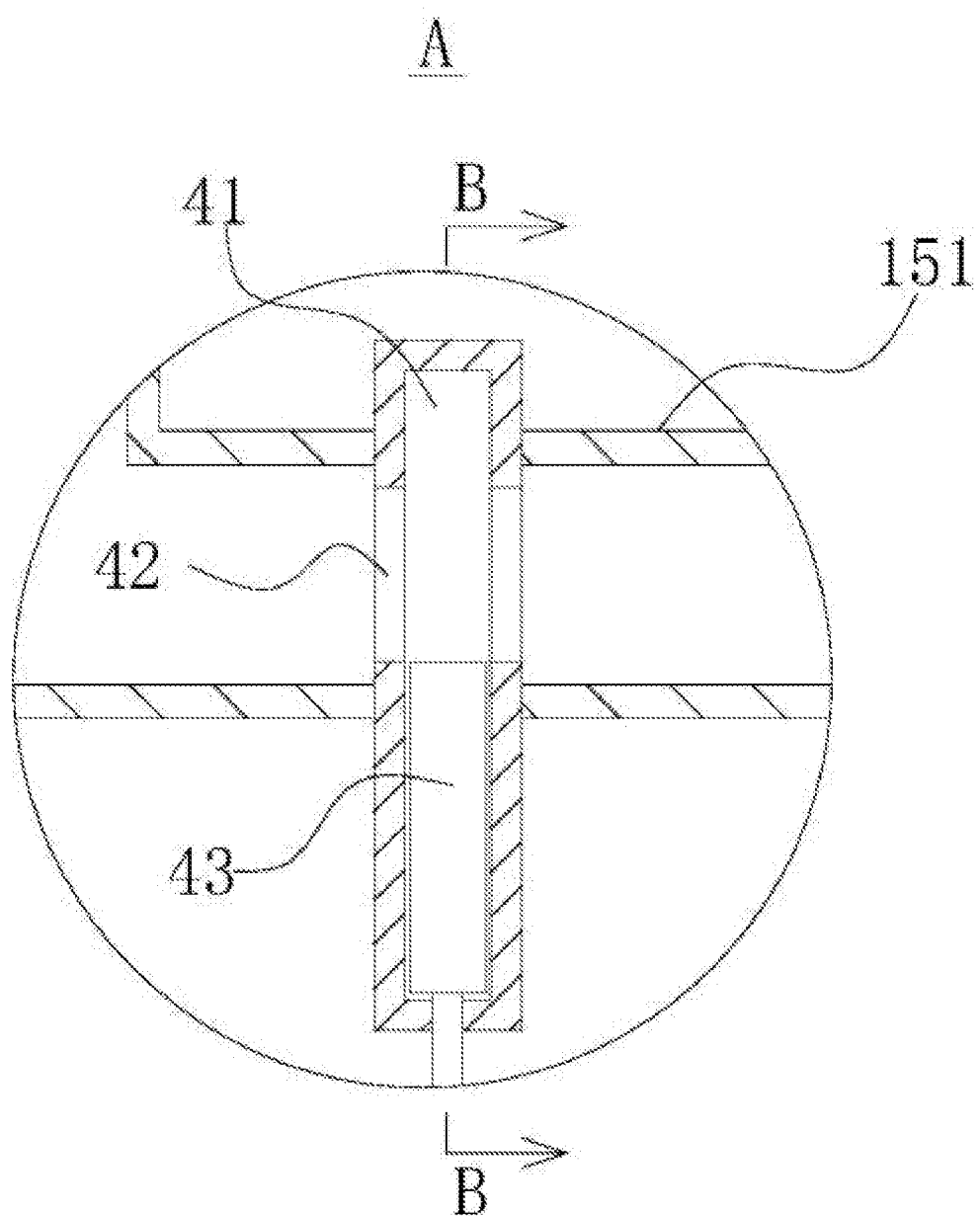
FIG. 2 is a partially enlarged view at "A" in FIG. 1.
Figure 3:
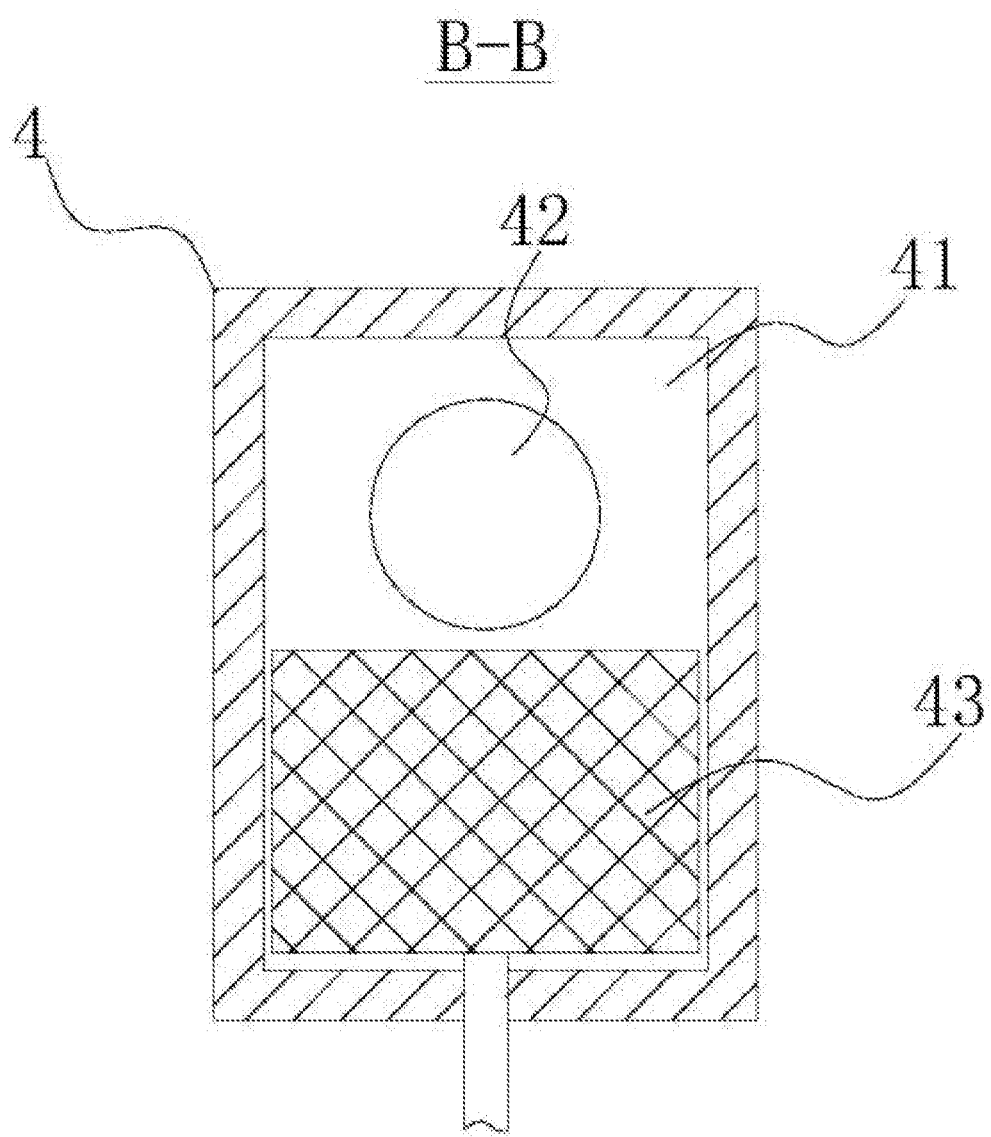
FIG. 3 is a sectional view taken along "B-B" in FIG. 2.
Figure 4:
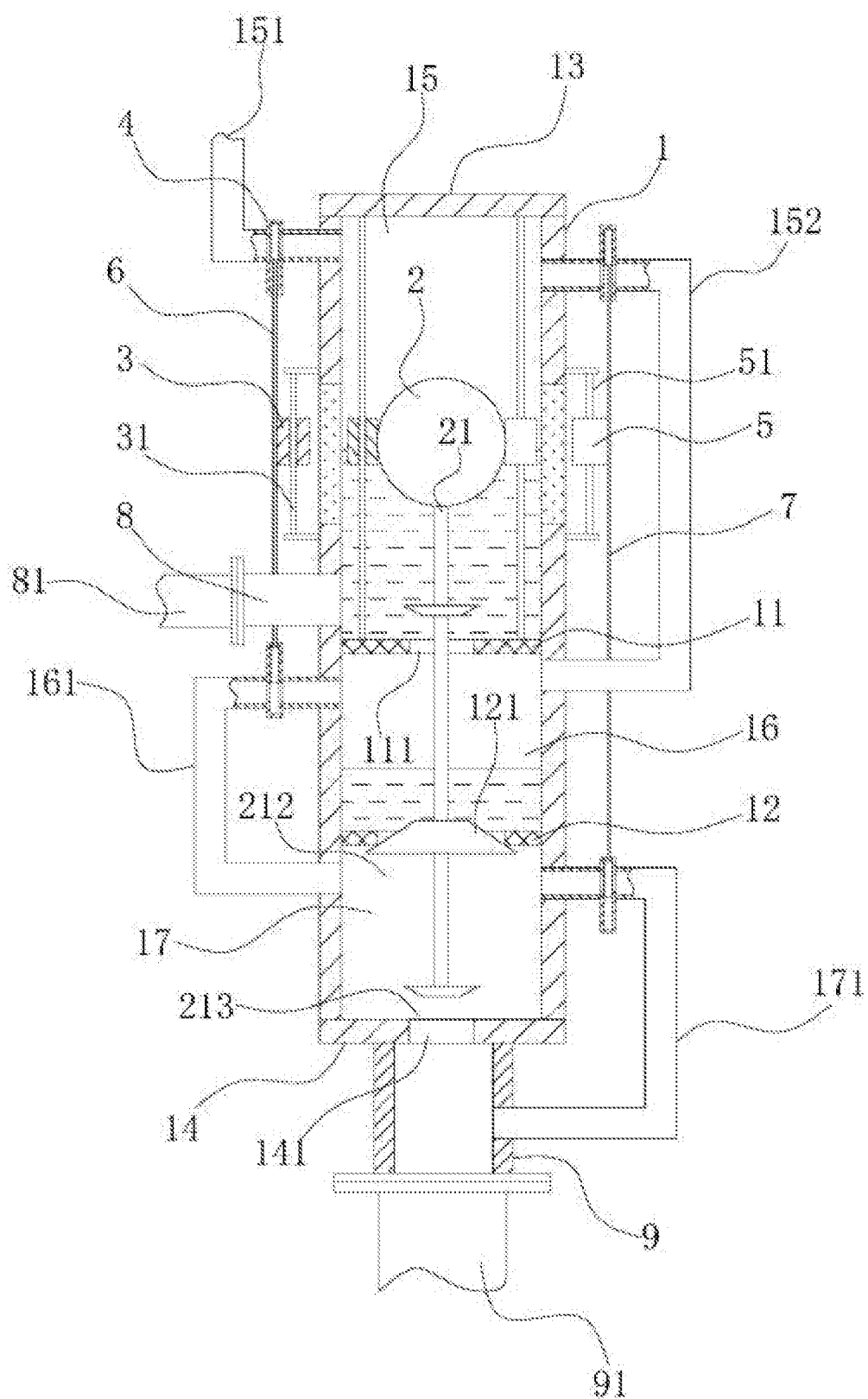
FIG. 4 is a structural schematic diagram when a floating ball floats upward according to an example of the present disclosure.

As shown in FIGS. 1-4, a return gas prevention device for a drainage pipe includes a round pipe 1, a water inlet 8, a water outlet 9 and a drainage mechanism.

An upper sealing plate 13 and a lower sealing plate 14 are disposed at upper and lower ends of the round pipe 1 respectively, and a third through-hole 141 is disposed on the lower sealing plate 14. A first partition plate 11 and a second partition plate 12 are both disposed inside the round pipe 1 and partition the interior of the round pipe 1 into an upper cavity 15, a middle cavity 16 and a lower cavity 17 in a top-down sequence, a first through-hole 111 is disposed on the first partition plate 11, and a second through-hole 121 is disposed on the second partition plate 12. The upper cavity 15 is in communication with the middle cavity through the first through-hole 111, and the middle cavity 16 is in communication with the lower cavity 17 through the second through-hole 121.

The water inlet 8 is in communication with the bottom of the upper cavity 15, and the water outlet 9 is disposed on the lower sealing plate 14 and in communication with the third through-hole 141. The water inlet 8 is connected with an inlet water pipe 81 through a flange, and the water outlet 9 is connected with an outlet water pipe 91 through a flange.

The drainage mechanism includes a floating ball 2, a guiding structure and a blocking structure. The floating ball 2 is located inside the upper cavity 15. The guiding structure enables the floating ball 2 to move up and down in the upper cavity 15 along with rise and fall of a water level. When the floating ball 2 ascends with the rising water level in the upper cavity 15, the blocking structure can block the second through-hole 121 and open the first through-hole 111 and the third through-hole 141 simultaneously; when the floating ball 2 descends with the falling water level in the upper cavity 15, the blocking structure can block the first through-hole 111 and the third through-hole 141 and open the second through-hole 121 simultaneously.

In an initial state, the water level in the upper cavity 15 is low, the blocking structure blocks the first through-hole 111 and the third through hole 141 at the same time. Sewage flows into the upper cavity 15 from the water inlet 8, so that the water level in the upper cavity 15 rises continuously. The floating ball 2 moves upward vertically under the action of the guiding structure, and the blocking structure opens the first through-hole 111 and the third through-hole 141 and closes the second through-hole 121 simultaneously, so that the sewage in the upper cavity 15 flows into the middle cavity 16 through the first through-hole 111. When a water outflow amount in the upper cavity 15 is greater than a water inflow amount, the water level in the upper cavity 15 falls, and the blocking structure closes the first through-hole 111 and the third through-hole 141 and opens the second through-hole 121 simultaneously, so that the sewage in the middle cavity 16 flows into the lower cavity 17 through the second through-hole 121. Since sewage only flows into the upper cavity 15 without sewage flowing out, the water level in the upper cavity 15 rises again, and the blocking structure re-opens the first through-hole 111 and the third through-hole 141 and re-closes the second through-hole 121 simultaneously, so that the sewage in the lower cavity 17 flows into the water outlet 9 through the third through-hole 141, and at the same time, the sewage water in the upper cavity 15 re-flows into the middle cavity 16 through the first through-hole 111. With the process repeated, sewage can be discharged rapidly and easily.

Specifically, the drainage device further includes a gas discharge mechanism and a driving mechanism.

The gas discharge mechanism includes an inlet gas pipe 151, a first communication gas pipe 152, a second communication gas pipe 161 and a third communication gas pipe 171. One end of the inlet gas pipe 151 is in communication with the top of the upper cavity 15, and the other end of the inlet gas pipe 151 is in communication with the outside. One end of the first communication gas pipe 152 is in communication with the top of the upper cavity 15, and the other end of the first communication gas pipe 152 is in communication with the top of the middle cavity 16. One end of the second communication gas pipe 161 is in communication with the top of the middle cavity 16, and the other end of the second communication gas pipe 161 is in communication with the top of the lower cavity 17. One end of the third communication gas pipe 171 is in communication with the top of the lower cavity 17, and the other end of the third communication gas pipe 171 is in communication with the water outlet 9.

When the floating ball 2 ascends along with the rising water level in the upper cavity 15, the driving mechanism can close the inlet gas pipe 151 and the third communication gas pipe 171 and open the first communication gas pipe 152 and the second communication gas pipe 161 simultaneously; when the floating ball 2 descends along with the falling water level in the upper cavity 15, the driving mechanism can close the first communication gas pipe 152 and the second communication gas pipe 161 and open the inlet gas pipe 151 and the third communication gas pipe 171 simultaneously.

When the water level in the upper cavity 15 rises, the floating ball 2 floats upward along with the water level, and the driving mechanism closes the inlet gas pipe 151 and the third communication gas pipe 171 and opens the first communication gas pipe 152 and the second communication gas pipe 161 simultaneously. Thus, the gas in the upper cavity 15 is discharged into the middle cavity 16 through the first communication gas pipe 152. Since the floating ball 2 floats upward, the blocking structure blocks the second through-hole 121 and opens the first through-hole 111 and the third through-hole 141. Thus, the sewage in the upper cavity 15 flows into the middle cavity 16 through the first through-hole, the pressure in the middle cavity 16 is greater than the pressure in the lower cavity 17, and therefore, the gas in the middle cavity 16 flows into the lower cavity 17 through the second communication gas pipe 161. Since the sewage in the upper cavity 15 flows into the middle cavity 16 continuously to enable the floating ball 2 to float downward, the driving mechanism opens the inlet gas pipe 151 and the third communication gas pipe 171 and closes the first communication gas pipe 152 and the second communication gas pipe 161. Thus, the water level in the upper cavity 15 drops to form a negative pressure to enable air to enter the upper cavity 15 through the inlet gas pipe 151. Since the flowing ball 2 descends, the blocking structure opens the second through hole 121 and closes the first through-hole 111 and the third through-hole 141. Thus, the sewage in the middle cavity 16 flows into the lower cavity 17 through the second through-hole 121, the pressure in the lower cavity 17 is greater than the pressure in the water outlet 9, and therefore, the gas in the lower cavity 17 flows into the water outlet 9 through the third communication gas pipe 171. Since the first through-hole 111 is blocked, the water level in the upper cavity 15 starts to rise, the pressure in the upper cavity 15 is greater than the pressure in the middle cavity 16. The floating ball 2 floats upward, and the driving mechanism re-closes the inlet gas pipe 151 and the third communication gas pipe 171 and re-opens the first communication gas pipe 152 and the second communication gas pipe 161. Thus, the gas in the upper cavity flows into the middle cavity 16 through the first communication gas pipe 152. In the drainage process, external air enters the water outlet 9 continuously through the inlet gas pipe 151, the first communication gas pipe 152, the second communication gas pipe 161 and the third communication gas pipe 171 to prevent channeling and returning of the gas in the water outlet.

Specifically, the guiding structure includes two guiding rods 153 and two guiding blocks 22.

The two guiding rods 153 are both vertically disposed inside the upper cavity 15 and located at both sides of the floating ball 2 respectively.

The two guiding blocks 22 are both disposed on the floating ball 2, and the two guiding blocks 22 are in one-to-one correspondence with two guiding rods 153, and slidably disposed on the corresponding guiding rods 153.

When the water level in the upper cavity 15 rises or falls, the guiding block 22 on the floating ball 2 slides up and down under the action of the guiding rod 13. The guiding rod 153 may limit a sliding range of the floating ball 2 and prevent the floating ball 2 from rotating.

Specifically, the blocking structure includes a connecting rod 21. One end of the connecting rod 21 is fixedly connected at the bottom of the floating ball 2, and the other end of the connecting rod 21 passes through the first through-hole 111, the second through-hole 121 and the third through-hole 141 sequentially and extends into the water outlet 9. Preferably, a size of the second through-hole 121 is greater than sizes of the first through-hole 111 and the third through-hole 141. The connecting rod 21 includes a first sealing block 211, a second sealing block 212 and a third sealing block 213. The first sealing block 211 is located above the first through-hole 111 and has a size larger than a diameter of the first through-hole 111, the second sealing block 212 is located below the second through-hole 121 and has a size larger than a diameter of the second through-hole 121, and a third sealing block 213 is located above the third through-hole 141 and has a size larger than a diameter of the third through-hole 141.

When the floating ball 2 floats upward, the second sealing block 212 moves upward to block the second through-hole 121, and the first sealing block 211 and the third sealing block 213 move up to be away from the first through-hole 111 and the third through-hole 141. In this case, the sewage in the upper cavity 15 flows into the middle cavity 16 through the first through-hole 111, and the sewage in the lower cavity 17 flows into the water outlet 9 through the third through-hole 141. When the floating ball 2 floats downward, the second sealing block 212 moves downward to be away from the second through-hole 121, and the first sealing block 211 and the third sealing block 213 move upward block the first through-hole 111 and the third through-hole 141. In this case, the sewage in the middle cavity 16 flows into the lower cavity 17 through the second through-hole 121. With upward and downward floats of the floating ball 2, the sewage in the water inlet 8 is discharged into the water outlet 9 sequentially through the upper cavity 15, the middle cavity 16 and the lower cavity 17. In addition, when no sewage enters the water inlet 8, the first sealing block 211 and the third sealing block 213 block the first through-hole 111 and the third through-hole 141. When the water pressure in the water outlet 9 increases to push the third sealing block 213 upward, the sewage flows back into the lower cavity through the third through-hole 141, and at the same time, the second sealing block 212 moves upward to block the second through-hole 121 so as to keep the sewage staying in the lower cavity 17 and prevent the sewage from flowing back into the water inlet 8.

Preferably, the first sealing block 211, the second sealing block 212 and the third sealing block 213 are all in a frustum shape, one end of the first sealing block 211 with a smaller cross section is close to the first through-hole 111, one end of the second sealing block 212 with a smaller cross section is close to the second through-hole 121, and one end of the third sealing block 213 with a smaller cross section is close to the third through-hole 141.

When the floating ball 2 floats upward, a frustum surface of the second sealing block 212 squeezes the second through-hole 121 with a gradually increasing squeezing force, so that the sewage in the middle cavity 16 will not leak from the second through-hole 121. When the floating ball 2 floats downward, a frustum surface of the first sealing block 211 squeezes the first through-hole 111 with a gradually increasing squeezing force, and a frustum surface of the third sealing block 213 squeezes the third through-hole 141 with a gradually increasing squeezing force, so that the sewage in the upper cavity 15 will not leak from the first through-hole 111 and the sewage in the lower cavity 17 will not leak from the third through-hole 141. Thus, gas return is avoided.

Specifically, the driving mechanism includes a first driving structure, a second driving structure and four on-off valves 4.

The four on-off valves 4 are disposed on the inlet gas pipe 151, the first communication gas pipe 152, the second communication gas pipe 161 and the third communication gas pipe 171 respectively. A valve cavity 41 is disposed in the on-off valve 4, a blocking plate 43 is slidably disposed inside the valve cavity 41, and an air hole 42 is disposed at both sides of the on-off valve 4 respectively. For the on-off valves 4 on the inlet gas pipe 151 and the third communication gas pipe 171, when the blocking plate 43 is at the bottom of the valve cavity 41, two air holes 42 are in communication with each other to open the inlet gas pipe 151 and the third communication gas pipe 171; when the blocking plate 43 is at the top of the valve cavity 41, two air holes 42 are blocked to close the inlet gas pipe 151 and the third communication gas pipe 171. For the on-off valves 4 on the first communication gas pipe 152 and the second communication gas pipe 161, when the blocking plate 43 is at the bottom of the valve cavity 41, two air holes 42 are blocked by the blocking plate 43 to close the first communication gas pipe 152 and the second communication gas pipe 161; when the blocking plate 43 is at the top of the valve cavity 41, two air holes 42 are in communication with each other to open the first communication gas pipe 152 and the second communication gas pipe 161.

When the floating ball 2 ascends with the rising water level in the upper cavity 15, the first driving structure can close the on-off valve 4 on the inlet gas pipe 151 and open the on-off valve 4 on the second communication gas pipe 161 simultaneously; when the floating ball 2 descends with the falling water level in the upper cavity 15, the first driving structure can open the on-off valve 4 on the inlet gas pipe 151 and close the on-off valve 4 on the second communication gas pipe 161 simultaneously.

When the floating ball 2 ascends with the rising water level in the upper cavity 15, the second driving structure can open the on-off valve 4 on the first communication gas pipe 152 and close the on-off valve 4 on the third communication gas pipe 171 simultaneously; when the floating ball 2 descends with the falling water level in the upper cavity, the second driving structure can close the on-off valve 4 on the first communication gas pipe 152 and open the on-off valve 4 on the third communication gas pipe 171 simultaneously.

When the floating ball 2 floats upward, under the actions of the first driving structure and the second driving structure, the on-off valve 4 on the inlet gas pipe 151 and the on-off valve 4 on the third communication gas pipe 171 are closed, and the on-off valve 4 on the first communication gas pipe 152 and the on-off valve 4 on the second communication gas pipe 161 are opened. In this case, the gas in the upper cavity 15 may be discharged into the middle cavity 16 through the first communication gas pipe 152, and the gas in the middle cavity 16 may be then discharged into the lower cavity 17 through the second communication gas pipe 161. When the floating ball 2 floats downward, under the actions of the first driving structure and the second driving structure, the on-off valve 4 on the inlet gas pipe 151 and the on-off valve 4 on the third communication gas pipe 171 are opened, and the on-off valve 4 on the first communication gas pipe 152 and the on-off valve 4 on the second communication gas pipe 161 are closed. In this case, the external gas may enter the upper cavity 15 through the inlet gas pipe 151, and the gas in the lower cavity 17 may be then discharged into the water outlet 9 through the third communication gas pipe 171.

Specifically, the first driving structure includes a first sliding rod 31, a first sliding block 3 and a first connecting rod 6.

The first sliding rod 31 is fixedly disposed on an outer side wall of the round pipe 1 through two support plates, and a length direction of the first sliding rod 31 is consistent with a length direction of the round pipe 1.

The first sliding block 3 is slidably disposed on the first sliding rod 31, and the first sliding block 3 and the guiding block located at the left side of the floating ball 2 are both permanent magnet. When sliding up and down, the guiding block 22 at the left side of the floating ball 2 can drive the first sliding block 3 to slide up and down.

The first connecting rod 6 is fixedly disposed on the first sliding block 3, one end of the first connecting rod 6 is connected with the on-off valve 4 on the inlet gas pipe 151, and the other end of the first connecting rod 6 is connected with the on-off valve 4 on the second communication gas pipe 161. When the first connecting rod 6 moves upward, the on-off valve 4 on the inlet gas pipe 151 is closed, and the on-off valve 4 on the second communication gas pipe 161 is opened simultaneously. When the first connecting rod 6 moves downward, the on-off valve 4 on the inlet gas pipe 161 is opened, and the on-off valve 4 on the second communication gas pipe 161 is closed simultaneously.

When the floating ball 2 floats upward, the guiding block 22 is driven to slide upward along the guiding rod 153. Under the magnetic force, the first sliding block 3 at the outer side of the round pipe 1 slides upward, the first connecting rod 6 moves upward to push the blocking plate 43 in the on-off valve 4 on the inlet gas pipe 151 to close the inlet gas pipe 151 and pull the blocking plate 43 in the on-off valve 4 on the second communication gas pipe 161 to open the second communication gas pipe 161 simultaneously.

Likewise, when the floating ball 2 floats downward, the guiding block 22 is driven to slide downward along the guiding rod 153. Under the magnetic force, the first sliding block 3 at the outer side of the round pipe 1 slides downward, and the first connecting rod 6 moves downward to pull the blocking plate 43 in the on-off valve 4 on the inlet gas pipe 151 to open the inlet gas pipe 151 and push the blocking plate 43 in the on-off valve 4 on the second communication gas pipe 161 to close the second communication gas pipe 161 simultaneously. With the upward and downward floats of the floating ball 2, the inlet gas pipe 151 and the second communication gas pipe 161 can be easily opened and closed.

Specifically, the second driving structure includes a second sliding rod 51, a second sliding block 5 and a second connecting rod 7.

The second sliding rod 51 is fixedly disposed on the outer side wall of the round pipe 1 through two support plates, and a length direction of the second sliding rod 51 is consistent with the length direction of the round pipe 1.

The second sliding block 5 is slidably disposed on the second sliding rod 51, the second sliding block 5 and the guiding block 22 at the right side of the floating ball 2 are both permanent magnet. When sliding up and down, the guiding block 22 at the right side of the floating ball 2 drives the second sliding block 5 to slide up and down.

One end of the second connecting rod 7 is connected with the on-off valve 4 on the first communication gas pipe 152, and the other end of the second connecting rod 7 is connected with the on-off valve 4 on the third communication gas pipe 171. When the second connecting rod 7 moves upward, the on-off valve 4 on the first communication gas pipe 152 is opened and the on-off valve 4 on the third communication gas pipe 171 is closed simultaneously. When the second connecting rod 7 moves downward, the on-off valve 4 on the first communication gas pipe 152 is closed and the on-off valve 4 on the third communication gas pipe 171 is opened simultaneously.

When the floating ball 2 floats upward, the guiding block 22 is driven to slide upward along the guiding rod 153. Under the magnetic force, the second sliding block 5 at the outer side of the round pipe 1 slides upward, and the second connecting rod 7 moves upward to push the blocking plate 43 inside the on-off valve 4 on the first communication gas pipe 152 to open the first communication gas pipe 152 and pull the blocking plate 43 inside the on-off valve 4 on the third communication gas pipe 171 to close the third communication gas pipe 171 simultaneously. Likewise, when the floating ball 2 floats downward, the guiding block 22 is driven to slide downward along the guiding rod 153. Under the magnetic force, the second sliding block 5 at the outer side of the round pipe 1 slides downward, and the second connecting rod 7 moves downward to pull the blocking plate 43 inside the on-off valve 4 on the first communication gas pipe 152 to close the first communication gas pipe 152 and push the blocking plate 43 inside the on-off valve 4 on the third communication gas pipe 171 to open the third communication gas pipe 171 simultaneously. With the upward and downward floats of the floating ball 2, the first communication gas pipe 152 and the third communication gas pipe 171 can be easily opened and closed.

Specifically, two penetration holes 154 are disposed in a left-right symmetry on the outer sidewall of the round pipe 1, a glass cover 155 is disposed on each of the two penetration holes 154, the two glass covers 155 are located at the left and right sides of the floating ball 2, and the two glass covers 155 are in one-to-one correspondence with the two guiding blocks 22 and located at outer sides of the corresponding guiding blocks 22. When sliding up and down, the first sliding block 3 and the second sliding block 5 are always within a coverage scope of the glass covers 155.

Because the first sliding block 3 and the second sliding block 5 slide up and down in synchronization with two guiding blocks 22 under the magnetic force, the glass cover 155 at the left side of the round pipe 1 is located between the first sliding block 3 and the guiding block 22 at the left side of the floating ball 2, and the glass cover 155 at the right side of the round pipe 1 is located between the second sliding block 5 and the guiding block 22 at the right side of the floating ball 2. The two glass covers 155 have the effect of sealing the upper cavity without interfering with magnetic forces between both of the first sliding block 3 and the second sliding block 5 and both of the two guiding blocks 22, so that the first sliding block 3 and the second sliding block 5 can slide up and down smoothly. Furthermore, the upward and downward floats of the floating ball 2 in the upper cavity 15 can be observed through the glass covers 155.

In the descriptions of the present disclosure, it is to be understood that an orientation or position relationship indicated by terms such as "upper", "lower", "inner" and "outer" is an orientation or position relationship shown based on the accompanying drawings. These terms are only used to facilitate describing the present disclosure and simplifying the description rather than indicate or imply that the indicated device or element should have a particular orientation or be constructed and operated in the particular orientation, and thus shall not be understood as limiting to the present disclosure.

The specific examples described herein are only illustrative of the spirit of the present disclosure. Persons skilled in the art may make various modifications or additions or substitutions in a similar manner to the described specific examples without departing from the spirit of the present disclosure or surpassing the scope defined by the appended claims.

We claim:

1. A return gas prevention device for a drainage pipe, comprising: a round pipe (1), a water inlet (8), a water outlet (9) and a drainage mechanism, wherein the round pipe (1) comprises an upper sealing plate (13), a lower sealing plate (14), a first partition plate (11) and a second partition plate (12), the upper sealing plate (13) and the lower sealing plate (14) are located at upper and lower ends of the round pipe (1) respectively, a third through-hole (141) is disposed on the lower sealing plate (14), the first partition plate (11) and the second partition plate (12) are both located inside the round pipe (1) and partition the interior of the round pipe (1) into an upper cavity (15), a middle cavity (16) and a lower cavity (17) in a top-down sequence, a first through-hole (111) is disposed on the first partition plate (11), and a second through-hole (121) is disposed on the second partition plate (12);

the water inlet (8) is in communication with a bottom of the upper cavity (15), and the water outlet (9) is disposed on the lower sealing plate (14) and in communication with the third through-hole (141); and the drainage mechanism comprises a floating ball (2), a guiding structure and a blocking structure, wherein the floating ball (2) is located inside the upper cavity (15), the guiding structure enables the floating ball (2) to move up and down in the upper cavity (15) along with rise and fall of a water level; the blocking structure is capable of blocking the second through-hole (121) and opening the first through-hole (111) and the third through-hole (141) simultaneously when the floating ball (2) ascends with the rising water level in the upper cavity (15) and is also capable of blocking the first through-hole (111) and the third through-hole (141) and opening the second through-hole (121) simultaneously when the floating ball (2) descends with the falling water level in the upper cavity (15).

2. The return gas prevention device for the drainage pipe according to claim 1, further comprising:
a gas discharge mechanism, comprising: an inlet gas pipe (151) with one end in communication with a top of the upper cavity (15) and the other end in communication with the outside; a first communication gas pipe (152) with one end in communication with the top of the upper cavity (15) and the other end in communication with a top of the middle cavity (16); a second communication gas pipe (161) with one end in communication with the top of the middle cavity (16) and the other end in communication with a top of the lower cavity (17); and a third communication gas pipe (171) with one end in communication with the top of the lower cavity (17) and the other end in communication with the water outlet (9); and
a driving mechanism, being capable of closing the inlet gas pipe (151) and the third communication gas pipe (171) and opening the first communication gas pipe (152) and the second communication gas pipe (161) simultaneously when the floating ball (2) ascends with the rising water level in the upper cavity (15); and being capable of closing the first communication gas pipe (152) and the second communication gas pipe (161) and opening the inlet gas pipe (151) and the third communication gas pipe (171) simultaneously when the floating ball (2) descends with the falling water level in the upper cavity (15).

3. The return gas prevention device for the drainage pipe according to claim 2, wherein the guiding structure comprises two guiding rods (153) and two guiding blocks (22), wherein,
the two guiding rods (153) are both vertically disposed inside the upper cavity (15) and located at both sides of the floating ball (2) respectively; and
the two guiding blocks (22) are both disposed on the floating ball (2), the two guiding blocks (22) are in one-to-one correspondence with the two guiding rods (153), and slidably disposed on the corresponding two guiding rods (153).

4. The return gas prevention device for the drainage pipe according to claim 3, wherein the blocking structure comprises a connecting rod (21),
wherein one end of the connecting rod (21) is fixedly connected at a bottom of the floating ball (2), and the other end of the connecting rod (21) passes through the first through-hole (111), the second through-hole (121) and the third through-hole (141) sequentially; the connecting rod (21) comprises a first sealing block (211) that is located above the first through-hole (111) and has a size larger than a diameter of the first through-hole (111); a second sealing block (212) that is located below the second through-hole (121) and has a size larger than a diameter of the second through-hole (121); and a third sealing block (213) that is located above the third through-hole (141) and has a size larger than a diameter of the third through-hole (141).

5. The return gas prevention device for the drainage pipe according to claim 4, wherein the driving mechanism comprises:
four on-off valves (4), disposed on the inlet gas pipe (151), the first communication gas pipe (152), the second communication gas pipe (161) and the third communication gas pipe (171) respectively;
a first driving structure, being capable of closing the on-off valve (4) on the inlet gas pipe (151) and opening the on-off valve (4) on the second communication gas pipe (161) simultaneously when the floating ball (2) ascends with the rising water level in the upper cavity (15); and being capable of closing the on-off valve (4) on the second communication gas pipe (161) and opening the on-off valve (4) on the inlet gas pipe (151) simultaneously when the floating ball (2) descends with the falling water level in the upper cavity (15); and
a second driving structure, being capable of closing the on-off valve (4) on the third communication gas pipe (171) and opening the on-off valve (4) on the first communication gas pipe (152) simultaneously when the floating ball (2) ascends with the rising water level in the upper cavity (15); and being capable of closing the on-off valve (4) on the first communication gas pipe (152) and opening the on-off valve (4) on the third communication gas pipe (171) simultaneously when the floating ball (2) descends with the falling water level in the upper cavity (15).

6. The return gas prevention device for the drainage pipe according to claim 5, wherein the first driving structure comprises a first sliding rod (31), a first sliding block (3) and a first connecting rod (6), wherein,
the first sliding rod (31) is fixedly disposed on an outer side wall of the round pipe (1) through two support plates, and a length direction of the first sliding rod (31) is consistent with a length direction of the round pipe (1);
the first sliding block (3) is slidably disposed on the first sliding rod (31), the first sliding block (3) and the guiding block (22) located at a left side of the floating ball (2) are both permanent magnets; and when sliding up and down, the guiding block (22) at the left side of the floating ball (2) drives the first sliding block (3) to slide up and down;
the first connecting rod (6) is fixedly disposed on the first sliding block (3), one end of the first connecting rod (6) is connected with the on-off valve (4) on the inlet gas pipe (151), and the other end of the first connecting rod (6) is connected with the on-off valve (4) on the second communication gas pipe (161); when the first connecting rod (6) moves upward, the on-off valve (4) on the inlet gas pipe (151) is closed, and the on-off valve (4) on the second communication gas pipe (161) is opened simultaneously; when the first connecting rod (6) moves downward, the on-off valve (4) on the inlet gas pipe (151) is opened, and the on-off valve (4) on the second communication gas pipe (161) is closed simultaneously.

7. The return gas prevention device for the drainage pipe according to claim 6, wherein the second driving structure comprises a second sliding rod (51), a second sliding block (5) and a second connecting rod (7), wherein,
the second sliding rod (51) is fixedly disposed on the outer side wall of the round pipe (1) through two support plates, and a length direction of the second sliding rod (51) is consistent with the length direction of the round pipe (1);

the second sliding block (5) is slidably disposed on the second sliding rod (51), the second sliding block (5) and the guiding block (22) located at the right side of the floating ball (2) are both permanent magnets; and when sliding up and down, the guiding block (22) at the right side of the floating ball (2) drives the second sliding block (5) to slide up and down slides;

one end of the second connecting rod (7) is connected with the on-off valve (4) on the first communication gas pipe (152), and the other end of the second connecting rod (7) is connected with the on-off valve (4) on the third communication gas pipe (171); when the second connecting rod (7) moves upward, the on-off valve (4) on the first communication gas pipe (152) is opened, and the on-off valve (4) on the third communication gas pipe (171) is closed simultaneously; when the second connecting rod (7) moves downward, the on-off valve (4) on the first communication gas pipe (152) is closed, and the on-off valve (4) on the third communication gas pipe (171) is opened simultaneously.

8. The return gas prevention device for the drainage pipe according to claim 7, wherein two penetration holes (154) are disposed in a left-right symmetry on the outer side wall of the round pipe (1), a glass cover (155) is sealably disposed on each of the penetration holes (154), and the two glass covers (155) are located at left and right sides of the floating ball (2) respectively, the two glass covers (155) are in one-to-one correspondence with the two guiding blocks (22), and located at outer sides of the corresponding two guiding blocks (22).

\* \* \* \* \*